United States Patent
Born et al.

(10) Patent No.: US 9,610,968 B2
(45) Date of Patent: Apr. 4, 2017

(54) SPINDLE DRIVE FOR THE HEIGHT ADJUSTMENT OF AN ELECTRICALLY ADJUSTABLE STEERING COLUMN

(71) Applicant: Daimler AG, Stuttgart (DE)

(72) Inventors: Christian Born, Hamburg (DE); Karsten Braeuer, Tostedt (DE); Torsten Harms, Hamburg (DE); Wjatscheslaw Malyschew, Hamburg (DE)

(73) Assignee: Daimler AG, Stuttgart (DE)

( * ) Notice: Subject to any disclaimer, the term of this patent is extended or adjusted under 35 U.S.C. 154(b) by 123 days.

(21) Appl. No.: 14/371,886

(22) PCT Filed: Jan. 11, 2013

(86) PCT No.: PCT/EP2013/000068
§ 371 (c)(1),
(2) Date: Jul. 11, 2014

(87) PCT Pub. No.: WO2013/104545
PCT Pub. Date: Jul. 18, 2013

(65) Prior Publication Data
US 2015/0000457 A1    Jan. 1, 2015

(30) Foreign Application Priority Data

Jan. 14, 2012 (DE) ........................ 10 2012 000 635

(51) Int. Cl.
*B62D 1/181* (2006.01)
*F16H 25/24* (2006.01)

(52) U.S. Cl.
CPC .............. *B62D 1/181* (2013.01); *F16H 25/24* (2013.01)

(58) Field of Classification Search
CPC .................................. B62D 1/181; F16H 25/24
See application file for complete search history.

(56) References Cited

U.S. PATENT DOCUMENTS

| | | | |
|---|---|---|---|
| 4,739,673 A | 4/1988 | Ishikawa et al. | |
| 6,079,743 A | 6/2000 | Grams | |

(Continued)

FOREIGN PATENT DOCUMENTS

| | | | |
|---|---|---|---|
| DE | 36 31 946 A1 | 4/1987 | |
| DE | 196 41 152 A1 | 4/1998 | |

(Continued)

OTHER PUBLICATIONS

International Search Report dated May 14, 2014 with English translation (five (5) pages).

(Continued)

*Primary Examiner* — Paul N Dickson
*Assistant Examiner* — Joselynn Y Sliteris
(74) *Attorney, Agent, or Firm* — Crowell & Moring LLP

(57) ABSTRACT

A spindle drive for the height adjustment of an electrically adjustable steering column and the steering includes an adjustment spindle rotatably mounted in two bearings. The adjustment spindle includes two clamping elements, which have a centering cone on their sides facing one another, and the adjustment spindle is arranged in a tensioned manner on the two bearings by means of the clamping element, in that the clamping elements abut on the outer sides of the centering cones facing away from one other. The outer sides of the bearings are formed having a counter contour to the respectively abutting centering cone.

14 Claims, 2 Drawing Sheets

(56) References Cited

U.S. PATENT DOCUMENTS

Figure 1:
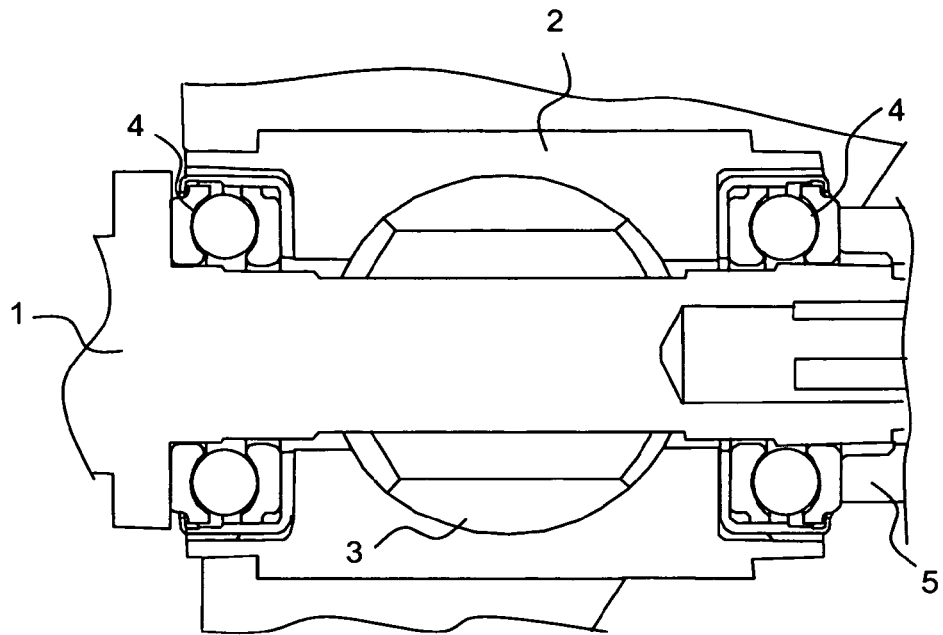

2002/0079685 A1  6/2002  Yoshimoto
2009/0031844 A1  2/2009  Iwakawa et al.

FOREIGN PATENT DOCUMENTS

| DE | 101 63 974 A1 | 7/2002 |
| DE | 11 2008 000 002 T5 | 2/2009 |
| EP | 1 905 664 A2 | 4/2008 |
| FR | 1 410 866 A | 9/1965 |

OTHER PUBLICATIONS

German-language Written Opinion (PCT/ISA/237) dated May 14, 2014 (four (4) pages).
German Search Report dated Nov. 12, 2012, including English-language translation (ten (10) pages).

PRIOR ART

SPINDLE DRIVE FOR THE HEIGHT ADJUSTMENT OF AN ELECTRICALLY ADJUSTABLE STEERING COLUMN

BACKGROUND AND SUMMARY OF THE INVENTION

Exemplary embodiments of the invention relate to a spindle drive for the height adjustment of an electrically adjustable steering column having an adjustment spindle.

German patent document DE 196 41 152 A1 discloses a motor vehicle steering column unit that has been simplified in construction having a steering column housing and steering column arranged therein and an electrically driven adjustment device both for the longitudinal adjustment and for the inclination adjustment of the steering column. This adjustment device has, on the one hand, an electrical drive unit for the rotary drive of an adjustment spindle and, on the other hand, at least two spindle nuts arranged on the adjustment spindle and moveably mounted with axial bearings in the axial direction of the adjustment spindle. For the longitudinal movement and for the inclination movement, a switch device is provided per one adjustment mechanism as well as per movement direction, wherein a non-positive connection can be produced between the respective switch device and the spindle nut adjacent to the switch device.

Furthermore, German patent document DE 101 63 974 A1 discloses a motor vehicle steering unit having electrical inclination adjustment with an improved stiffness of the steering column in the vertical and horizontal direction. The motor vehicle steering unit has an inclination adjustment mechanism arranged on one side of the steering column to convert a rotary driving force of the electromotor into a straight-line movement, in order to thus set the inclination of the steering column, and a slide section arranged on the other side of the steering column, which is in sliding contact with a fixed side via a fitting, in order to thus be able to slide the steering column when setting the inclination. An adjustment spindle, referred to there as a screw shaft, is described for the inclination adjustment, which is mounted rotatably on its upper and lower ends in axial deep groove ball bearings. The upper bearing is fixed with a fixing screw, onto which a means is attached which prevents a release. By tightening this screw to a determined torsional moment, the bearings are pre-tensioned such that they securely support the screw shaft at the upper and lower end in the transverse direction.

Thus, until now, the adjustment spindles for the inclination mechanism of a steering column have been mounted in a floating manner with the axial deep groove ball bearings or needle bearings, which are tensioned with a plate spring or a nut.

Due to bearing play as a consequence of component and manufacturing tolerances, the adjustment spindle inserted between the bearings begins to oscillate in the operation during adjustment, which leads to undesired noises and to wear. In order to prevent this, until now, an exact alignment of the spindle drive has been necessary, requiring considerable effort.

In view of this prior art, exemplary embodiments of the present invention are directed to a spindle drive for an electrically adjustable steering column having an adjustment spindle for the height adjustment, which prevents the occurrence of oscillation in the adjustment operation and thus eliminates noise development and wear, and furthermore can be assembled with little effort.

Furthermore, exemplary embodiments of the present invention are directed to an electrically adjustable steering column having an adjustment spindle for the height adjustment, in which no oscillation occurs in the adjustment operation due to bearing play as a result of manufacturing and component tolerances, which lead to undesired noises and wear.

A spindle drive for height adjustment of an electrically adjustable steering column according to the invention comprises an adjustment spindle, which is mounted rotatably by means of two bearings. According to the invention, the adjustment spindle has two clamping elements, which have a centering cone on sides facing one another. Thus, the adjustment spindle is tensioned by means of the clamping elements on the two bearings, on the outer sides of which that face away from each other the clamping elements having the centering cones abut. For this purpose, the outer sides of the bearings are formed having a counter contour to the respectively abutting centering cone. Using the tensioning of the spindle on the bearings that is centered with the cones, no oscillation occurs in the adjustment operation due to the component and manufacturing tolerances. The noise occurring during adjustment can thus be reduced and also the waste can thus be reduced that is caused by spindle drives having undesired noise development during adjustment. As well as the noise optimization and reduction of the waste, the quality of the spindle drive is also improved as the wear in the height adjustment is reduced due to the prevention of the occurrence of oscillation.

One of the clamping elements can be formed by a widened head of the spindle, which is then formed with the centering cone on the corresponding side of the head facing the bearing.

The second clamping element can be formed by a lock ring attached to the end of the spindle facing away from the head and which is formed with the centering cone. During attachment of the lock ring, its centering cone is arranged facing the bearing.

This lock ring can be manufactured from a plastic or from an elastomer. The attachment onto the spindle can take place by pressing. Furthermore, the lock ring can bear an additional bearing support ring or a plate spring. Herein, for a lock ring made from elastomer it is preferred that the lock ring is vulcanized onto the bearing support ring or the plate spring.

Thus the assembly is significantly simplified in comparison to the prior art, as the elaborate alignment is omitted due to the centering cones, which tension the spindle on the bearings.

As an alternative to the lock ring as a second clamping element, a screw nut can be provided, which is attached to the end of the spindle facing away from the head and is formed with the centering cone. In order to prevent a release in the operation, the screw nut can have a self-locking thread.

For the two bearings mounting the adjustment spindle, contact ball bearings, preferably in an O-arrangement, can be used in particular, whereby the guiding of the spindle is further and more tightly centered.

Furthermore, the invention relates to an electrically adjustable steering column having a height adjustment mechanism, which comprises a spindle drive having an adjustment spindle mounted rotatably by means of two bearings. Due to the use of a spindle drive according to an embodiment according to the invention with the adjustment spindle tensioned by the centering cones of the clamping elements on the bearings, a steering column is created, the height adjustment of which is possible without undesired noises, and which has a longer service life of the adjustment mechanism due to the reduced wear as a consequence of the elimination of oscillation.

BRIEF DESCRIPTION OF THE DRAWING FIGURES

These and further advantages are presented by the following description with reference to the enclosed figures. The reference to the figures in the description serves for the simplified understanding of the subject matter. Subject matters or parts of subject matters, which are fundamentally the same or similar, can be provided with the same reference numerals. The figures are only a schematic depiction of one embodiment of the invention.

Figure 2:
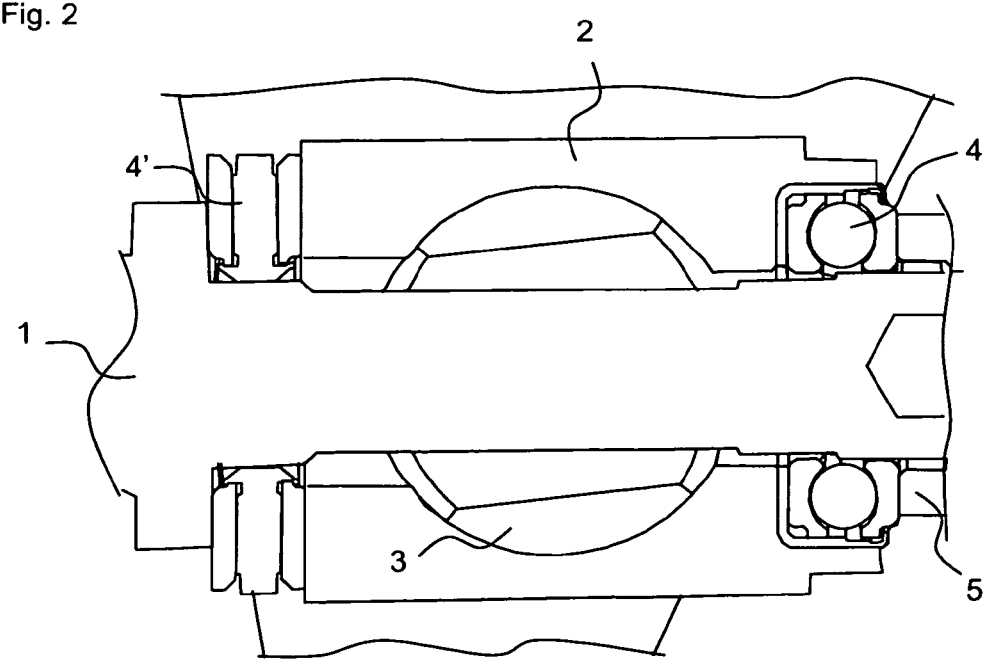
Figure 3:
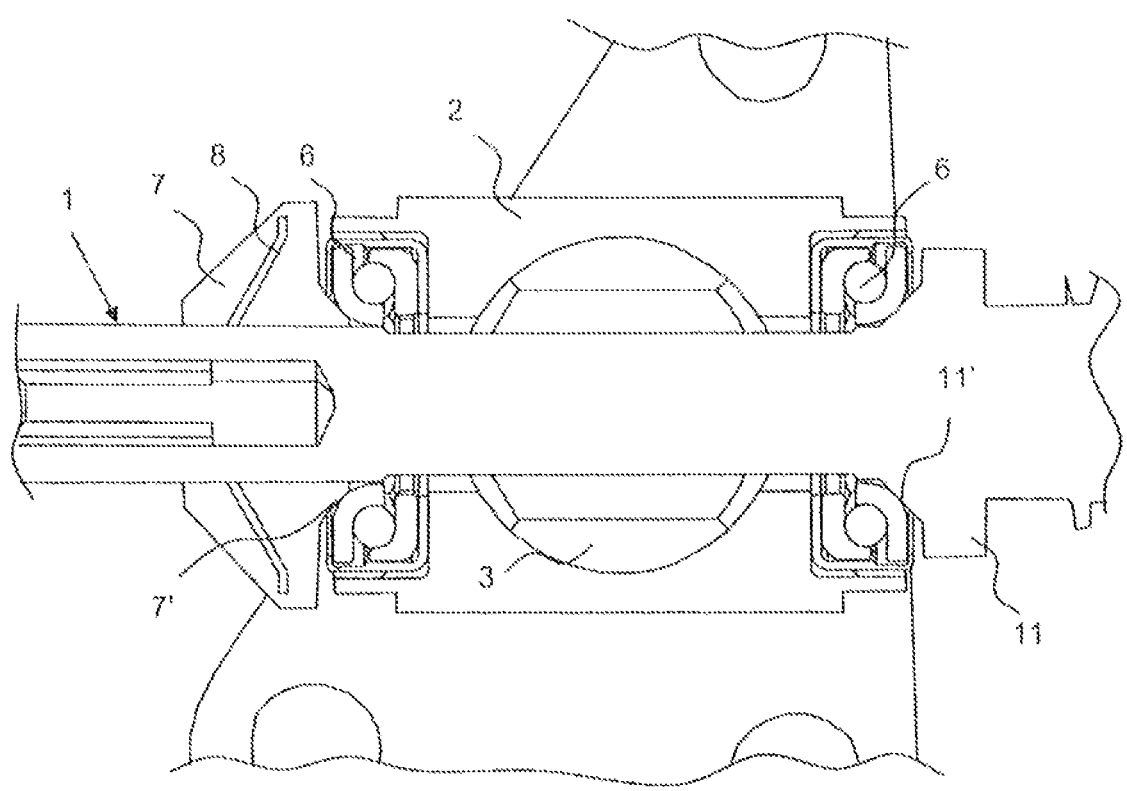

Here are shown:

FIG. 1 in a sectional view, the mounting of a height adjustment unit of an electrically adjustable safety steering column having two axial deep grove ball bearings from prior art, FIG. 2 in a sectional view, the mounting of a height adjustment unit of an electrically adjustable safety steering column having one axial deep grove ball bearing and one needle bearing from prior art, FIG. 3 in a sectional view, the mounting according to the invention of a height adjustment unit of an electrically adjustable safety steering column having two contact ball bearings.

DETAILED DESCRIPTION

The device according to the invention relates to the height adjustment of an electrically adjustable steering column, by means of a spindle drive, which comprises an adjustment spindle 1 mounted rotatably in two bearings 6.

For the height or inclination adjustment, the electrically adjustable steering columns mostly have an adjustment spindle 1. FIGS. 1 and 2 show two mounting variations of the height adjustment unit known from the prior art. Until now, the spindle 1 has been held by two bearings 4, 4'; for this purpose, FIG. 1 shows the mounting having two axial deep groove ball bearings 4 and FIG. 2 the mounting having one axial deep groove ball bearing 4 and a needle bearing 4'. The bearings 4, 4' sit in an axle bearing support 2 in which the bearing support 3 of the height adjustment is received, and are clamped with a locking nut 5. In the operation, the spindle 1 begins to oscillate due to bearing play between bearing and spindle due to component and manufacturing tolerances, which leads to undesired noises and wear. In order to prevent his, until now, an exact alignment of the spindle drive has been necessary, requiring considerable effort.

In order to create a spindle drive in a simple way, as, for example, is depicted in FIG. 3, for the adjustment of the steering column, which works with low noise levels and reduced wear, according to the invention it is proposed that the spindle 1 bears two clamping elements 7, 11 having a centering cone 7', 11' respectively, by means of which the spindle 1 is tensioned on both bearings 6, wherein the clamping elements 7, 11, with their cone 7', 11', abut on a corresponding counter contour of the outer side of the bearing 6. The cones 7', 11' are therefore on sides of the clamping elements 7, 11 that are facing one another.

Due to the fact that the spindle 1 is centered during assembly by the cones 7', 11' into a precisely defined position, during the tensioning on the bearings 6, a robust mounting of the spindle 1 is achieved, such that the oscillation is prevented.

In a preferred embodiment, as is depicted in FIG. 3, one of the two clamping elements 7, 11 is formed by a widened spindle head 11, on which the cone 11' is formed.

Furthermore, the other clamping element 7 can preferably be formed by a ring 7, which is attached to the other end of the spindle 1 for the tensioning of the bearing 6. The ring 7 likewise has a cone 7' on the side facing the head 11.

The ring 7 can preferably consist of a plastic or an elastomer and is pressed onto the spindle 1. Additionally, the ring 7 can bear a bearing support ring 8 or a plate spring, which prevents an unintentional and/or automatic release of the ring 7 from the clamping position. Preferably, the elastomer ring 7 is vulcanized onto the bearing support ring or the plate spring 8.

As is shown in FIG. 3, the two bearings 6 are designed preferably as contact ball bearings 6, whereby the guiding of the spindle 1 is further and more tightly centered.

The mounting according to the invention with the autocentering of the driving spindle 1 force controls the tensioning of the bearings 6 by the corresponding design of the clamping element 7, 11, designed with the centering cones 7',11' and with the contact ball bearings 6, having the lock ring 7.

The two contact ball bearings 6 are assembled in an O-arrangement. A contact ball bearing 6 can, for example, have 20 balls having a 2 mm diameter. Obviously, other numbers of balls having other correspondingly appropriate diameters can also be selected.

Instead of the clamping ring 7, a screw nut having a conical formation can be used. However, here the unscrewing moment is varyingly large and thus no defined tensioning is possible. In order to prevent the risk of the loosening in the operation, further constructive provisions can be provided on the nut, such as, for example, a self-locking threading.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A spindle drive for height adjustment of an electrically adjustable steering column, which comprises:
    an adjustment spindle rotatably mounted in two bearings,
    wherein the adjustment spindle comprises two clamping elements, wherein each of the two clamping elements has a centering cone on a side of the clamping element that faces the other clamping element,
    wherein the adjustment spindle is arranged in a tensioned manner on the two bearings by the two clamping elements,
    wherein the respective centering cones abut on respective outer sides of the two bearings, each of the respective outer sides of the two bearings are formed with a counter contour to the respectively abutting centering cone.

2. The spindle drive of claim 1, wherein a first clamping element of the two clamping elements is formed by a widened head of the adjustment spindle and wherein the respective centering cone of the first clamping element is formed on the widened head.

3. The spindle drive of claim 2, wherein a second clamping element of the two clamping elements is formed by a lock ring, the lock ring is attached on an end of the adjustment spindle facing away from the widened head and wherein the respective centering cone of the second clamping element is formed on the lock ring.

4. The spindle drive of claim 3, wherein the lock ring
   is made from a plastic or an elastomer,
   is pressed onto the adjustment spindle, or
   bears an additional bearing support ring or a plate spring, wherein the lock ring is vulcanized onto the bearing support ring or the plate spring.

5. The spindle drive of claim 2, wherein a second clamping element of the two clamping elements is formed by a screw nut, the screw nut
   is attached to an end of the adjustment spindle facing away from the widened head,
   is formed with the respective centering cone, and
   has a self-locking thread.

6. The spindle drive of claim 1, wherein the two bearings are contact ball bearings.

7. The spindle drive of claim 6, wherein the contact ball bearings are arranged in an O-arrangement.

8. An electrically adjustable steering column, comprising:
   a height adjustment mechanism, which comprises a spindle drive having an adjustment spindle rotatably mounted by two bearings,
   wherein the spindle drive comprises
      an adjustment spindle rotatably mounted in the two bearings,
      wherein the adjustment spindle comprises two clamping elements, wherein each of the two clamping elements has a centering cone on a side of the clamping element that faces the other clamping element,
      wherein the adjustment spindle is arranged in a tensioned manner on the two bearings by the two clamping elements,
      wherein the respective centering cones abut on respective outer sides of the two bearings, each of the respective outer sides of the two bearings are formed with a counter contour to the respectively abutting centering cone.

9. The electrically adjustable steering column of claim 8, wherein a first clamping element of the two clamping elements is formed by a widened head of the adjustment spindle and wherein the respective centering cone of the first clamping element is formed on the widened head.

10. The electrically adjustable steering column of claim 9, wherein a second clamping element of the two clamping elements is formed by a lock ring, the lock ring is attached on an end of the adjustment spindle facing away from the widened head and wherein the respective centering cone of the second clamping element is formed on the lock ring.

11. The electrically adjustable steering column of claim 10, wherein the lock ring
    is made from a plastic or an elastomer,
    is pressed onto the adjustment spindle, or
    bears an additional bearing support ring or a plate spring, wherein the lock ring is vulcanized onto the bearing support ring or the plate spring.

12. The electrically adjustable steering column of claim 9, wherein a second clamping element of the two clamping elements is formed by a screw nut, the screw nut
    is attached to an end of the adjustment spindle facing away from the widened head,
    is formed with the respective centering cone, and
    has a self-locking thread.

13. The electrically adjustable steering column of claim 8, wherein the two bearings are contact ball bearings.

14. The electrically adjustable steering column of claim 13, wherein the contact ball bearings are arranged in an O-arrangement.

* * * * *